(12) United States Patent
Ichikawa

(10) Patent No.: US 9,150,113 B2
(45) Date of Patent: Oct. 6, 2015

(54) VEHICLE CONFIGURED TO BE CHARGED USING AN EXTERNAL POWER SOURCE

(75) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 564 days.

(21) Appl. No.: 13/514,787

(22) PCT Filed: Dec. 28, 2009

(86) PCT No.: PCT/JP2009/071743
§ 371 (c)(1),
(2), (4) Date: Jun. 8, 2012

(87) PCT Pub. No.: WO2011/080814
PCT Pub. Date: Jul. 7, 2011

(65) Prior Publication Data
US 2012/0256589 A1    Oct. 11, 2012

(51) Int. Cl.
*H02J 7/00* (2006.01)
*B60L 11/18* (2006.01)

(52) U.S. Cl.
CPC ......... *B60L 11/1824* (2013.01); *B60L 11/1803* (2013.01); *B60L 11/185* (2013.01); *B60L 11/1818* (2013.01); *H02J 7/00* (2013.01); *B60L 2210/30* (2013.01); *B60L 2220/14* (2013.01); *B60L 2230/12* (2013.01); *Y02T 10/7005* (2013.01); *Y02T 10/7088* (2013.01); *Y02T 10/7241* (2013.01); *Y02T 90/121* (2013.01); *Y02T 90/127* (2013.01); *Y02T 90/128* (2013.01); *Y02T 90/14* (2013.01)

(58) Field of Classification Search
CPC ...... H02J 7/0042; H02J 7/0045; Y02E 60/12; H01M 10/46; H01M 10/44; H01R 13/6675; Y02T 90/14; Y02T 10/7055; Y02T 10/725; Y02T 10/92; Y02T 10/6221; B60K 6/26; B60K 6/48; B60L 2210/20; B60L 11/1868; B60L 11/1811
USPC ......................................... 320/111, 107, 109
See application file for complete search history.

(56) References Cited

U.S. PATENT DOCUMENTS 5,545,046 A * 8/1996 Masuda et al. ................ 439/142
5,931,245 A   8/1999 Uetake et al.
(Continued)

FOREIGN PATENT DOCUMENTS

JP    A-7-79502     3/1995
JP    A-11-199189   7/1999
(Continued)

OTHER PUBLICATIONS

International Search Report issued in International Patent Application PCT/JP2009/071743 dated Mar. 23, 2010.

*Primary Examiner* — Drew A Dunn
*Assistant Examiner* — Tessema Kebede
(74) *Attorney, Agent, or Firm* — Oliff PLC

(57) ABSTRACT

A vehicle externally chargeable includes a power storage device, an AC/DC converter, an inlet, a first power line, at least one connector inserted in the first power line, and a second power line. To the inlet, a charging cable can be connected to transfer electric power from an external power source. The first power line is connected to the inlet and the AC/DC converter. The second power line is branched from a path that is located on the first power line and that connects the connector and the AC/DC converter to each other.

7 Claims, 9 Drawing Sheets

(56) References Cited

U.S. PATENT DOCUMENTS

| | | | |
|---|---|---|---|
| 8,427,103 B2* | 4/2013 | Ohtomo | 320/109 |
| 2009/0079389 A1 | 3/2009 | Ohtomo | |
| 2009/0102433 A1* | 4/2009 | Kamaga | 320/165 |
| 2009/0242291 A1* | 10/2009 | Sagawa et al. | 180/65.265 |
| 2010/0315040 A1* | 12/2010 | Sakurai | 320/109 |
| 2011/0187184 A1 | 8/2011 | Ichikawa | |
| 2012/0086267 A1 | 4/2012 | Ichikawa | |

FOREIGN PATENT DOCUMENTS

| | | |
|---|---|---|
| JP | A-2000-264547 | 9/2000 |
| JP | A-2003-73099 | 3/2003 |
| JP | U-3093370 | 5/2003 |
| JP | A-2003-219511 | 7/2003 |
| JP | 2003244832 A * | 8/2003 |
| JP | A-2003-244832 | 8/2003 |
| JP | A-2005-348867 | 12/2005 |
| JP | B2-3729862 | 12/2005 |
| JP | A-2009-77557 | 4/2009 |
| JP | A-2009-112076 | 5/2009 |
| JP | A-2009-202677 | 9/2009 |
| JP | A-2009-225587 | 10/2009 |
| JP | A-2009-227218 | 10/2009 |
| JP | A-2010-28882 | 2/2010 |
| WO | WO 2011/001534 A1 | 1/2011 |

* cited by examiner

VEHICLE CONFIGURED TO BE CHARGED USING AN EXTERNAL POWER SOURCE

TECHNICAL FIELD

The present invention relates to a vehicle, more particularly, a vehicle having a power storage device chargeable using a power source external to the vehicle.

BACKGROUND ART

In recent years, as an environmentally friendly vehicle, a vehicle has been drawing attention which has a power storage device (for example, a secondary battery, a capacitor, or the like) and travels using driving power resulting from electric power stored in the power storage device. Examples of such a vehicle include an electric vehicle, a hybrid vehicle, a fuel cell vehicle, and the like. There have been proposed techniques of charging the power storage device of each of these vehicles using a commercial power source, which is high in power generation efficiency.

Among hybrid vehicles, there has been also known a vehicle which has a power storage device chargeable from a power source external to the vehicle (hereinafter, also simply referred to as "external power source") as with electric vehicles. For example, a so-called "plug-in hybrid vehicle" has been known which has a power storage device chargeable from a power source of a general house when connecting a power receptacle of the house and a charging port of the vehicle to each other via a charging cable. In this way, improved fuel consumption efficiency can be expected in the hybrid vehicle.

Japanese Patent Laying-Open No. 2003-244832 (PTL 1) discloses a technique for prohibiting charging of a battery of an electric vehicle when a reel type cord, which is provided in the vehicular body to serve as a charging cord to charge the battery, is in a reeled state.

According to the technique disclosed in Japanese Patent Laying-Open No. 2003-244832 (PTL 1), a storage space for the charging cord can be made small while restraining heat generation of the charging cord.

CITATION LIST

Patent Literature

PTL 1: Japanese Patent Laying-Open No. 2003-244832

SUMMARY OF INVENTION

Technical Problem

Apart from the manner of receiving power from the power source external to the vehicle by connecting the vehicular cord to the household power receptacle as disclosed in Japanese Patent Laying-Open No. 2003-244832 (PTL 1), electric power is received by connecting a dedicated charging cable provided outside the vehicle, to a power receiving opening (inlet) of the vehicle. In view of these, it is considered to configure a vehicle to include a power receiving cord connectable to a household power receptacle as well as an inlet to which a dedicated charging cable can be connected.

In such a configuration including both the inlet and the power receiving cord, connectors may be provided in power lines that connect the inlet and the power receiving cord to a power converting device, in order to facilitate replacement of components. The power converting device is adapted to covert alternating-current power supplied from outside the vehicle, into direct-current power, which can charge the power storage device provided in the vehicle. The number of connectors provided therein becomes large depending on a connection location of the first power line for connecting the inlet and the power converting device to each other and the second power line for connecting the power receiving cord and the power converting device to each other. This may lead to decreased efficiency in charging from an external power source.

The present invention has been made in view of the foregoing problem, and has its object to provide a connection configuration for a plurality of paths in a vehicle that can be supplied with power through the paths from an external power source, so as to restrain decrease of charging efficiency.

Solution to Problem

A vehicle according to the present invention is a vehicle externally chargeable using electric power from an external power source. The vehicle includes a power storage device that is chargeable, a power converting device, an inlet, first and second power lines, and a connector. The power converting device converts electric power supplied from the external power source, into electric power for charging the power storage device. The inlet is provided at an external surface of the vehicle. To the inlet, a charging cable is connected from outside the vehicle so as to transfer electric power from the external power source. The first power line is connected to the inlet and the power converting device. At least one connector is inserted in the first power line. The second power line is branched from a path that is located on the first power line and that connects the connector and the power converting device to each other.

Preferably, the vehicle further includes a power receiving cord for transferring electric power from a receptacle of the external power source to the vehicle. The power receiving cord has one end connected to the second power line and has the other end connected to a plug for connection to the receptacle.

Preferably, the vehicle further includes a cord reel for reeling the power receiving cord for storage.

Preferably, in the vehicle, the power receiving cord and the inlet are selectively used for the external charging.

Preferably, the vehicle further includes: a switching unit for switching between supply and interrupt of electric power from the power receiving cord to the power converting device; and a control device for controlling the switching unit. When the external charging is performed using electric power supplied from the power receiving cord, the control device controls the switching unit to bring the switching unit into an electrically conductive state, and when the external charging is performed using electric power supplied from the inlet, the control device controls the switching unit to bring the switching unit into an electrically non-conductive state.

Preferably, the vehicle further includes: a first power receiving port provided with the inlet; a second power receiving port provided with a pullout opening for the power receiving cord; and first and second cover units respectively coupled to the first and second power receiving ports. The first cover unit is opened when the inlet is used. The second cover unit is coupled to the second power receiving port, and is opened when the power receiving cord is used. When the first cover unit is opened, opening of the second cover unit is prohibited, and when the second cover unit is opened, opening of the first cover unit is prohibited.

Preferably, the vehicle further includes a cord reel for reeling the power receiving cord for storage; and a pullout prohibiting unit. The pullout prohibiting unit prohibits pullout of the power receiving cord from the cord reel when the external charging is performed using electric power supplied from the inlet.

Advantageous Effects of Invention

According to the present invention, in a vehicle that can be externally supplied with electric power through a plurality of paths, the plurality of paths are connected to each other to restrain decrease of charging efficiency.

DESCRIPTION OF EMBODIMENTS

Figure 1:
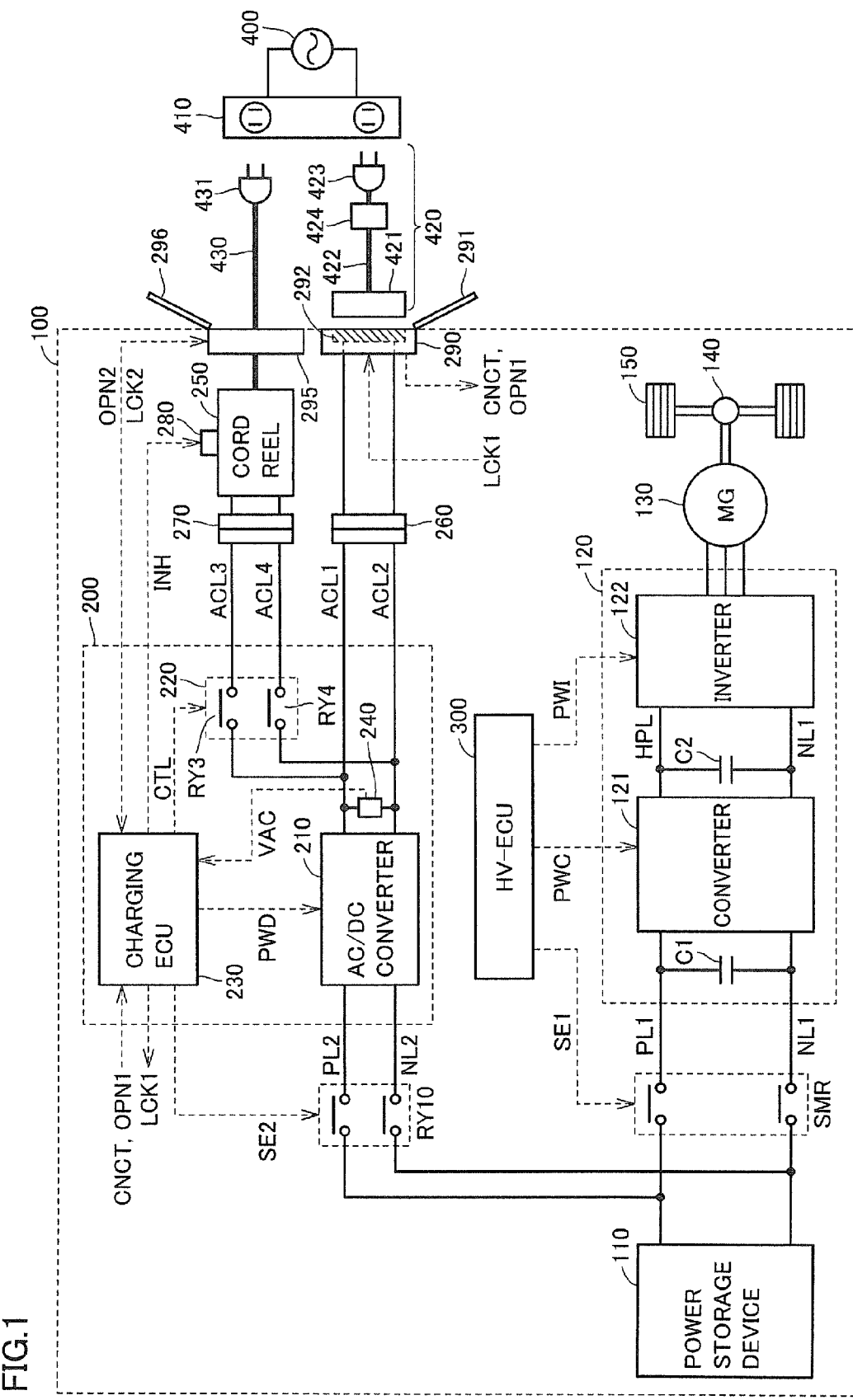
FIG. 1 is an overall block diagram of a vehicle according to the present embodiment.

The following describes an embodiment of the present invention with reference to figures. It should be noted that the same or corresponding portions are given the same reference characters and are not described repeatedly.

FIG. 1 is an overall block diagram of a vehicle 100 according to the present embodiment.

Referring to FIG. 1, vehicle 100 includes: a power storage device 110; a system main relay (SMR); a PCU (Power Control Unit) 120 serving as a driving device; a motor generator 130; a power transmitting gear 140; driving wheels 150; and an HV-ECU (Electronic Control Unit) 300.

Power storage device 110 is a power storage component configured to be chargeable/dischargeable. Power storage device 110 is configured to include, for example, a secondary battery such as a lithium ion battery, a nickel-hydrogen battery, or a lead accumulator; or a power storage element such as an electric double layer capacitor.

Power storage device 110 is connected to PCU 120 via a power line PL1 and a ground line NL1. Power storage device 110 supplies electric power to PCU 120 so as to generate driving power for vehicle 100. Further, power storage device 110 stores electric power generated by motor generator 130. Power storage device 110 provides an output of, for example, approximately 200 V.

The SMR includes relays inserted in power line PL1 and ground line NL1 both connecting power storage device 110 and PCU 120 to each other. The SMR switches between supply and interrupt of electric power between power storage device 110 and PCU 120, based on a control signal SE1 from HV-ECU 300.

PCU 120 includes a converter 121, an inverter 122, and capacitors C1, C2.

Converter 121 performs voltage conversion between each of power line PL1 and ground line NL1 and each of a power line HPL and ground line NL1, based on a control signal PWC from HV-ECU 300.

Inverter 122 is connected to power line HPL and ground line NL1. Inverter 122 is supplied with direct-current power from converter 121 and converts the direct-current power into alternating-current power based on a control signal PWI from HV-ECU 300 so as to drive motor generator 130.

Capacitor C1 is provided between power line PL1 and ground line NL1, and reduces voltage fluctuation between power line PL1 and ground line NL1. Further, capacitor C2 is provided between power line HPL and ground line NL1, and reduces voltage fluctuation between power line HPL and ground line NL1.

Motor generator 130 is an alternating-current rotating electrical machine, such as a permanent-magnet type synchronous motor including a rotor having a permanent magnet embedded therein.

An output torque from motor generator 130 is transmitted to driving wheels 150 via power transmitting gear 140 constituted of a speed reducer or a power split device, whereby vehicle 100 travels. During regenerative braking operation of vehicle 100, motor generator 130 can generate electric power by means of rotational power from driving wheels 150. The electric power thus generated is converted by PCU 120 into electric power for charging power storage device 110.

It should be noted that FIG. 1 shows a configuration in which one motor generator and one inverter are provided, but the number of motor generators and the number of inverters are not limited to these. A plurality of pairs of motor generators and inverters may be provided.

Further, in the case of hybrid vehicles each provided with an engine (not shown) apart from motor generator 130, required vehicle driving power is generated by cooperatively operating the engine and motor generator 130. In this case, power storage device 110 can be charged using electric power generated by rotation of the engine.

In other words, vehicle 100 in the present embodiment represents a vehicle having a motor for generating vehicle driving power. Examples of vehicle 100 include: a hybrid vehicle using an engine and a motor to generate vehicle driving power; electric vehicle and fuel cell vehicle both having no engine; and the like.

Although not illustrated in FIG. 1, HV-ECU 300 includes a CPU (Central Processing Unit), a memory device, and an input/output buffer so as to receive a signal from each sensor or the like, send a control signal to each device, and control vehicle 100 and each device. It should be noted that these controls are not limited to those by software processing, and can be implemented by processing using dedicated hardware (electronic circuit).

HV-ECU 300 generates and outputs control signals for controlling PCU 120, the SMR, and the like.

It should be noted that FIG. 1 illustrates a configuration in which HV-ECU 300 is constituted of one control device, but individual control devices may be provided for respective functions or respective devices to be controlled. For example, a control device for PCU 120 and a control device for power storage device 110 may be provided.

Vehicle 100 includes an inlet 292, a charging device 200, and a relay RY10 as a configuration for charging power storage device 110 using electric power from external power source 400. Further, charging device 200 includes an AC/DC converter 210, a switching unit 220, a charging ECU 230, and a voltage sensor 240.

Inlet 292 is provided in a power receiving port 290 provided at an external surface of vehicle 100. Further, an openable/closable cover unit (hereinafter, also referred to as "lid") 291 is connected to power receiving port 290 so as to cover inlet 292 when the vehicle is not externally charged.

Connected to inlet 292 is a charging connector 421 of charging cable 420. Then, electric power is transferred from external power source 400 to vehicle 100 via charging cable 420.

Charging cable 420 includes: charging connector 421; a plug 423 for connection to a receptacle 410 of external power source 400; and an electric wire portion 422 that connects charging connector 421 and plug 423 to each other. Further, in electric wire portion 422, a charging circuit interrupt device (hereinafter, also referred to as "CCID (Charging Circuit Interrupt Device)") 424 is inserted to switch between supply and interrupt of electric power from external power source 400.

Inlet 292 is connected to charging device 200 via power lines ACL1, ACL2. In power lines ACL1, ACL2, a connector 260 is provided. This connector 260 is connectable and disconnectable. When inlet 292 needs to be replaced due to a trouble or the like for example, connector 260 allows inlet 292 to be disconnected from charging device 200.

Vehicle 100 further includes a power receiving cord 430 and a cord reel 250, as the other path for charging power storage device 110 using electric power from external power source 400.

Power receiving cord 430 has one end connected to a plug 431 for connection to receptacle 410 of external power source 400. Power receiving cord 430 has the other end connected to power lines ACL3, ACL4 connected to charging device 200.

A connector 270 is provided in power lines ACL3, ACL4. This connector 270 is connectable and disconnectable. When power receiving cord 430 or cord reel 250 needs to be replaced due to a trouble or the like for example, connector 270 allows receiving cord 430 or cord reel 250 to be disconnected from charging device 200.

Further, power lines ACL3, ACL4 are connected, via a switching unit 220, to power lines ACL1, ACL2 between connector 260 and AC/DC converter 210.

When the vehicle is not externally charged, power receiving cord 430 is reeled and stored in cord reel 250. When the vehicle is externally charged using power receiving cord 430, power receiving cord 430 is pulled out from a pullout opening (not shown in the figure) of power receiving port 295 provided at the external surface of vehicle 100. When plug 431 is connected to receptacle 410, electric power is transferred from external power source 400 to vehicle 100.

It should be noted that FIG. 1 illustrates a configuration in which charging cable 420 and power receiving cord 430 are both connected to the same receptacle 410 of external power source 400, but electric power may be supplied from a different power source (voltage) using charging cable 420 or power receiving cord 430. For example, when the external power source has a voltage of 200 V, charging cable 420 may be used, whereas when the external power source has a voltage of 100 V, power receiving cord 430 may be used.

Further, an openable/closable lid 296 is coupled to power receiving port 295 so as to cover the pullout opening when the vehicle is not externally charged.

Cord reel 250 is, for example, a reel having a drum-like shape configured to allow power receiving cord 430 to be wound around its circumference. It should be noted that this cord reel 250 is not an essential configuration. Instead of cord reel 250, a container box may be provided to contain power receiving cord 430 therein, for example. However, in order to reduce a space in which power receiving cord 430 is contained, it is preferable to employ the cord reel.

Further, cord reel 250 is provided with a pullout prohibiting unit 280 for prohibiting power receiving cord 430 from being pulled out. This pullout prohibiting unit 280 prevents pullout of power receiving cord 430 in accordance with a control signal INH from charging ECU 230, by fixing cord reel 250 so as not to rotate cord reel 250, for example.

AC/DC converter 210 is connected to inlet 292 via power lines ACL1, ACL2. Further, AC/DC converter 210 is connected to power storage device 110 via relay RY10 by a power line PL2 and a ground line NL2.

AC/DC converter 210 converts the alternating-current power supplied from inlet 292 or power receiving cord 430, into electric power for charging power storage device 110.

Switching unit 220 includes relays RY3, RY4 respectively inserted in power lines ACL3, ACL4. Relays RY3, RY4 are controlled in accordance with a control signal CTL from charging ECU 230 to switch between supply and interrupt of the alternating-current power transferred via power receiving cord 430. While the vehicle is externally charged using power receiving cord 430, relays RY3, RY4 are closed. When the vehicle is not externally charged using power receiving cord 430, relays RY3, RY4 are opened.

If switching unit 220 is not provided and the vehicle is externally charged using charging cable 420, plug 431 of power receiving cord 430 is in an electrically conductive state. Plug 431 generally has a portion to be inserted into a receptacle and having an electric path exposed therein. Hence, when plug 431 in the electrically conductive state is brought into contact with the body of the vehicle or the like, short circuit or ground fault is likely to take place. This may lead to a trouble or damage on devices. In view of this, switching unit 220 is provided at the power lines ACL3, ACL4 side, thereby bringing plug 431 into an electrically non-conductive state when the vehicle is externally charged using charging cable 420. Accordingly, a trouble resulting from ground fault or the like can be prevented.

It should be noted that the present embodiment has illustrated a configuration in which switching unit 220 is included in charging device 200, but switching unit 220 may be disposed external to charging device 200.

As with HV-ECU 300, although not shown in FIG. 1, charging ECU 230 includes a CPU, a memory device, and an input/output buffer so as to receive a signal from each sensor or the like, send a control signal to each device, and control charging device 200. It should be noted that these controls are not limited to those by software processing, but can be implemented by processing using dedicated hardware (electronic circuit).

Charging ECU 230 receives a detection value of a voltage VAC of the external power source from voltage sensor 240 provided between power lines ACL1, ACL2. Based on this voltage VAC, charging ECU 230 generates a control signal PWD for controlling AC/DC converter 210.

Charging ECU 230 employs a control signal SE2 to control relay RY10. Further, charging ECU 230 employs a control signal CTL to control switching unit 220.

Charging ECU 230 receives opening/closing signals OPN1, OPN2 indicating opening/closing states of lids 291, 296, which are detected by switches (not shown in the figure) provided in power receiving ports 290, 295. Further, charging ECU 230 receives a connection signal CNCT indicating that charging connector 421 has been connected to inlet 292.

Charging ECU 230 sends lock signals LCK1, LCK2 to power receiving ports 290, 295 so as to prohibit opening of lids 291, 296. Charging ECU 230 employs lock signals LCK1, LCK2 to control lock mechanisms not shown in the figure and provided in power receiving ports 290, 295, so as not to open lids 291, 296. It should be noted that when lock signal LCK1 is set at ON, the lock mechanism prohibits opening of lid 291. On the other hand, when lock signal LCK2 is set at ON, opening of lid 296 is prohibited.

Figure 2:
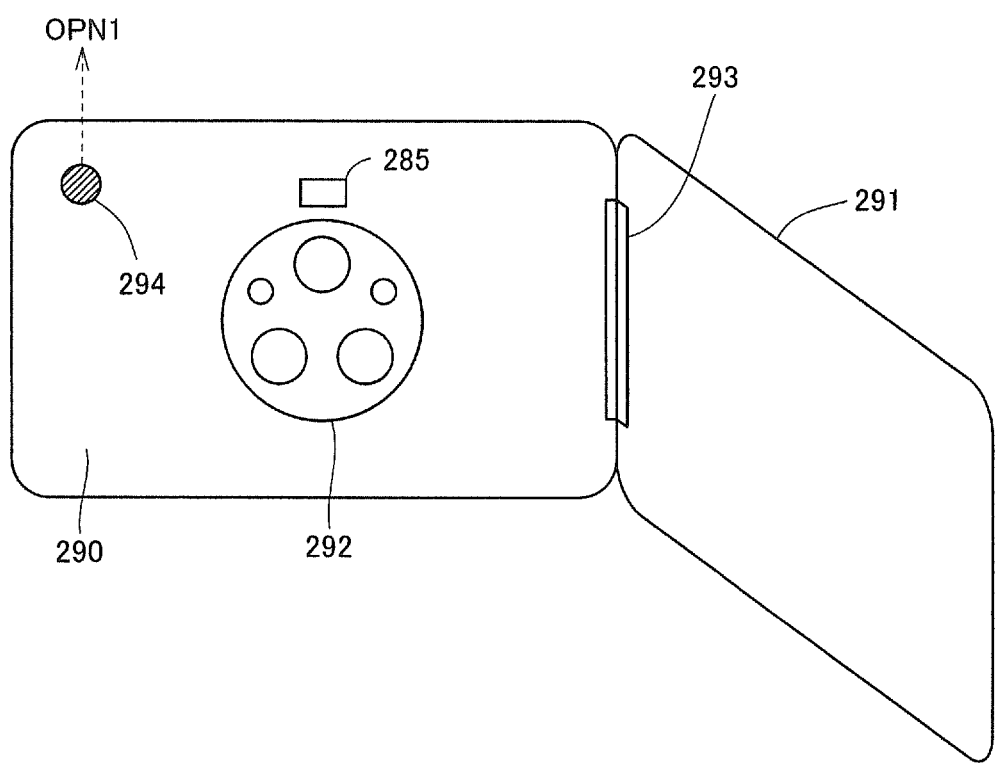
FIG. 2 shows details of a power receiving port at the inlet side.

FIG. 2 shows details of power receiving port 290.

Referring to FIG. 2, lid 291 is coupled to power receiving port 290 via a joint 293 such as a hinge. Further, power receiving port 290 includes: inlet 292; switch 294 for detecting opening/closing state of lid 291; and a protruding portion 285. Lid 291 is shaped to cover inlet 292 when lid 291 is closed. Lid 291 is opened when inlet 292 is used. When inlet 292 is not used, lid 291 is closed. Switch 294 is configured to be closed when lid 291 is closed. In response to this, switch 294 sends opening/closing signal OPN1 to charging ECU 230.

Figure 3:
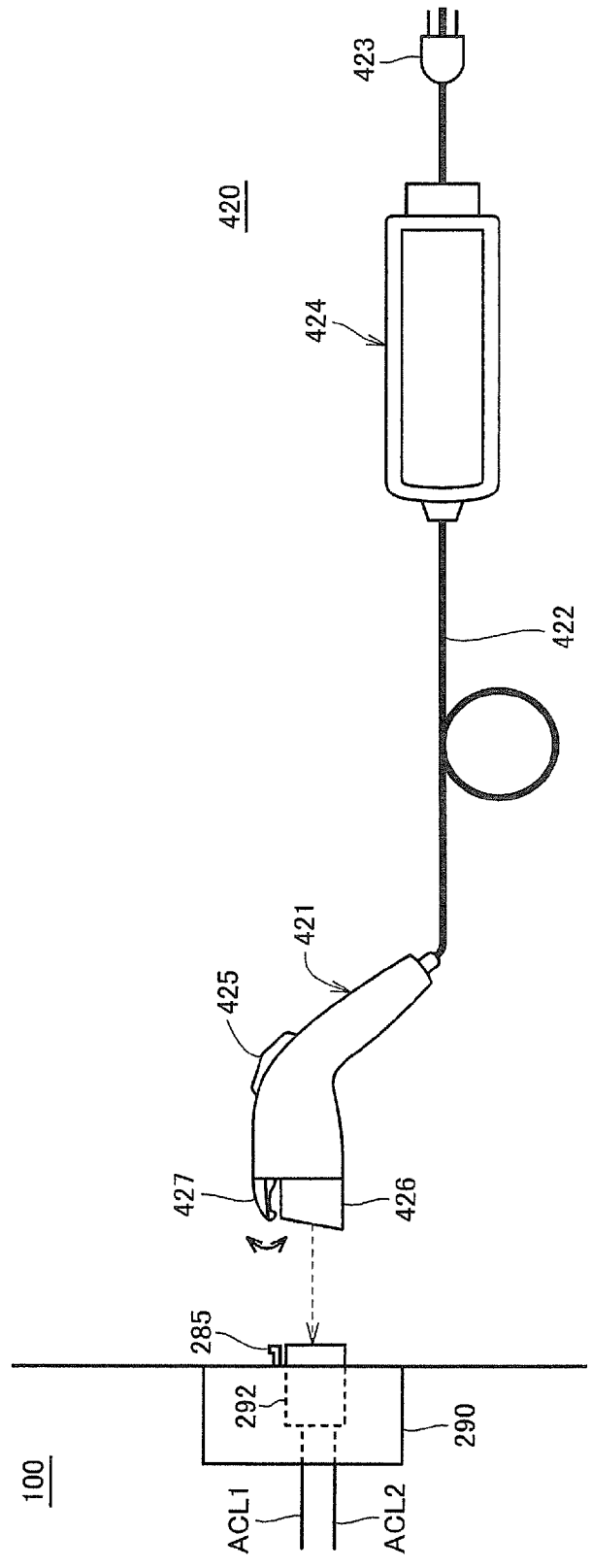
FIG. 3 is an external view of a charging cable.

FIG. 3 is an external view of charging cable 420. Referring to FIG. 3, as described above, charging cable 420 includes charging connector 421, electric wire portion 422, plug 423, and CCID 424. Further, charging connector 421 includes an operation switch 425, a coupler unit 426, and a latch unit 427.

Coupler unit 426 is provided with a plurality of connection terminals (not shown in the figure). When inserted into inlet 292 of vehicle 100, power lines (not shown in the figure) in electric wire portion 422 are connected to power lines ACL1, ACL2 of the vehicle side.

In the present embodiment, operation switch 425 is a release button for operating latch unit 427 for preventing charging connector 421 from slipping out therefrom. Latch unit 427 is operated in conjunction with an operation for operation switch 425.

Specifically, when charging connector 421 is connected to inlet 292, a tab at the tip of latch unit 427 is latched on protruding portion 285 of FIG. 2 so as to prevent charging connector 421 from accidentally slipping out of inlet 292. When operation switch 425 is pressed down, the tab at the tip of latch unit 427 is detached from protruding portion 285, whereby charging connector 421 can be pulled out of inlet 292.

CCID 424 includes relays (not shown in the figure) for switching between supply and interrupt of electric power from external power source 400 to vehicle 100. CCID 424 further includes an electrical leakage detector (not shown in the figure). When electric leakage is detected in charging cable 420, CCID 424 utilizes the above-described relays to interrupt electric power from external power source 400.

Figure 4:
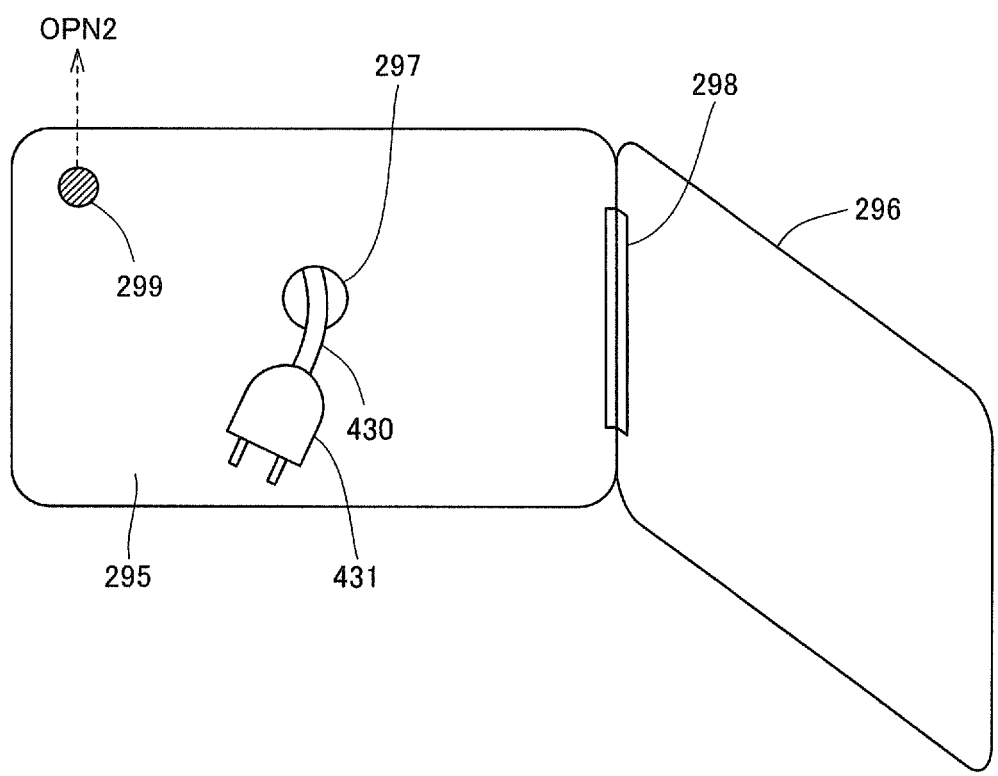
FIG. 4 shows details of a power receiving port at the power receiving cord side.

FIG. 4 shows details of power receiving port 295.

Referring to FIG. 4, power receiving port 295 is coupled to lid 296 via a joint 298 such as a hinge. Further, power receiving port 295 includes pullout opening 297 for power receiving cord 430, and switch 299 for detecting the opening/closing state of lid 296. Lid 296 is shaped to cover pullout opening 297 when lid 296 is closed. Lid 296 is opened when power receiving cord 430 is used. When power receiving cord 430 is not used, lid 296 is closed. Switch 299 is configured to be closed when lid 296 is closed. In response to this, switch 299 sends opening/closing signal OPN2 to charging ECU 230.

Figure 5:
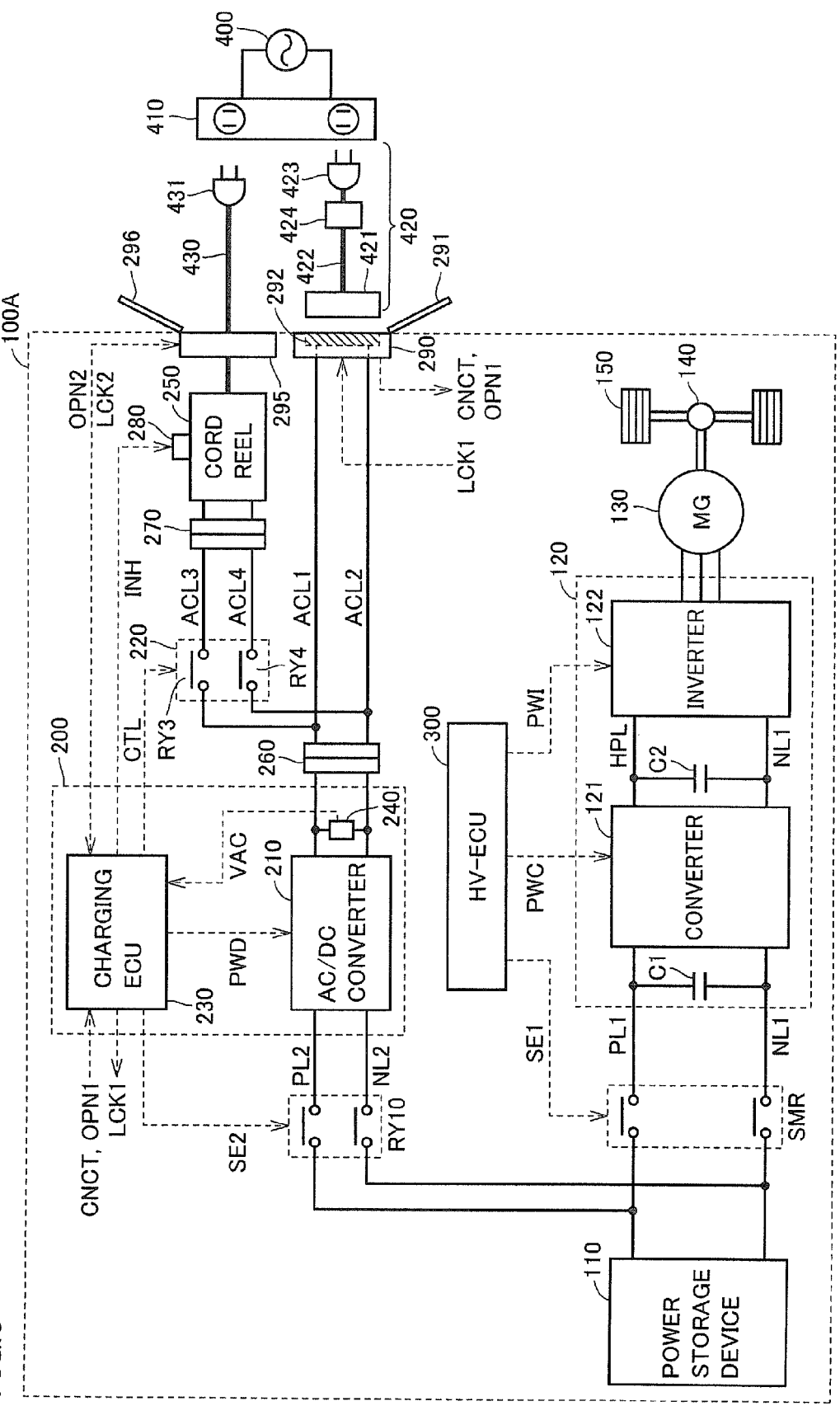
FIG. 5 is an overall block diagram of a vehicle in a comparative example.

In the present embodiment, as described above, power lines ACL3, ACL4 for transferring electric power from power receiving cord 430 to charging device 200 are connected to power lines ACL1, ACL2 between connector 260 and AC/DC converter 210. FIG. 5 shows an overall block diagram showing a vehicle 100A serving as a comparative example in which power lines ACL3, ACL4 are connected to power lines ACL1, ACL2 between inlet 292 and connector 260.

In the configuration of the comparative example of FIG. 5, when electric power is supplied from power receiving cord 430, the electric power is transferred via two connectors, i.e., connector 260 and connector 270. In a general connector, metal conductors respectively disposed at the connecting side (male side) and the connected side (female side) in the connector are brought into contact with each other to form an electrically conductive state. Accordingly, depending on the metal conductors' fitting state, and the metal conductors' surface states resulting from oxidation, corrosion, and the like, a contact area of the metal conductors are presumably decreased. This leads to increased resistance at the contact portion to result in possible heat generation at the contact portion of the metal conductors. As a result, energy consumed by the heat generation presumably causes decrease of transferring efficiency of electric power. In view of this, the number of connectors via which electric power is transferred needs to be reduced as much as possible.

On the other hand, when assembling or repairing the vehicle, it is effective to make connection using a connector in order to facilitate installing or replacing each component. Hence, each component is desirably replaced by a connector, independently.

In consideration of these, in the configuration such as vehicle 100A illustrated as the comparative example, electric power is supplied from power receiving cord 430 via the two connectors, i.e., connector 260 and connector 270. Further, in this comparative example, replacement of inlet 292 requires replacement of portions of power lines ACL3, ACL4 that at least extend to connector 270 from their portions branched from power lines ACL1, ACL2.

To address this, in the present embodiment, as shown in FIG. 1, power lines ACL3, ACL4 are connected to a path that connects AC/DC converter 210 to at least one connector (connector 260 in FIG. 1) provided in power lines ACL1, ACL2, which connect inlet 292 and AC/DC converter 210 to each other. With such a connection configuration, the number of connectors via which electric power is transferred during the external charging can be reduced, thereby restraining decrease of transferring efficiency of electric power. Further, for replacement of components, each component can be replaced independently.

It should be noted that even in the case where an additional connector is provided between connector 260 and AC/DC converter 210 in FIG. 1, branching locations of power lines ACL3, ACL4 are not limited as long as they are between connector 260 and AC/DC converter 210. However, in order to reduce, as much as possible, the number of connectors via which electric power is transferred, power lines ACL3, ACL4 are desirably branched from between AC/DC converter 210 and a connector closest to AC/DC converter 210.

Figure 6:
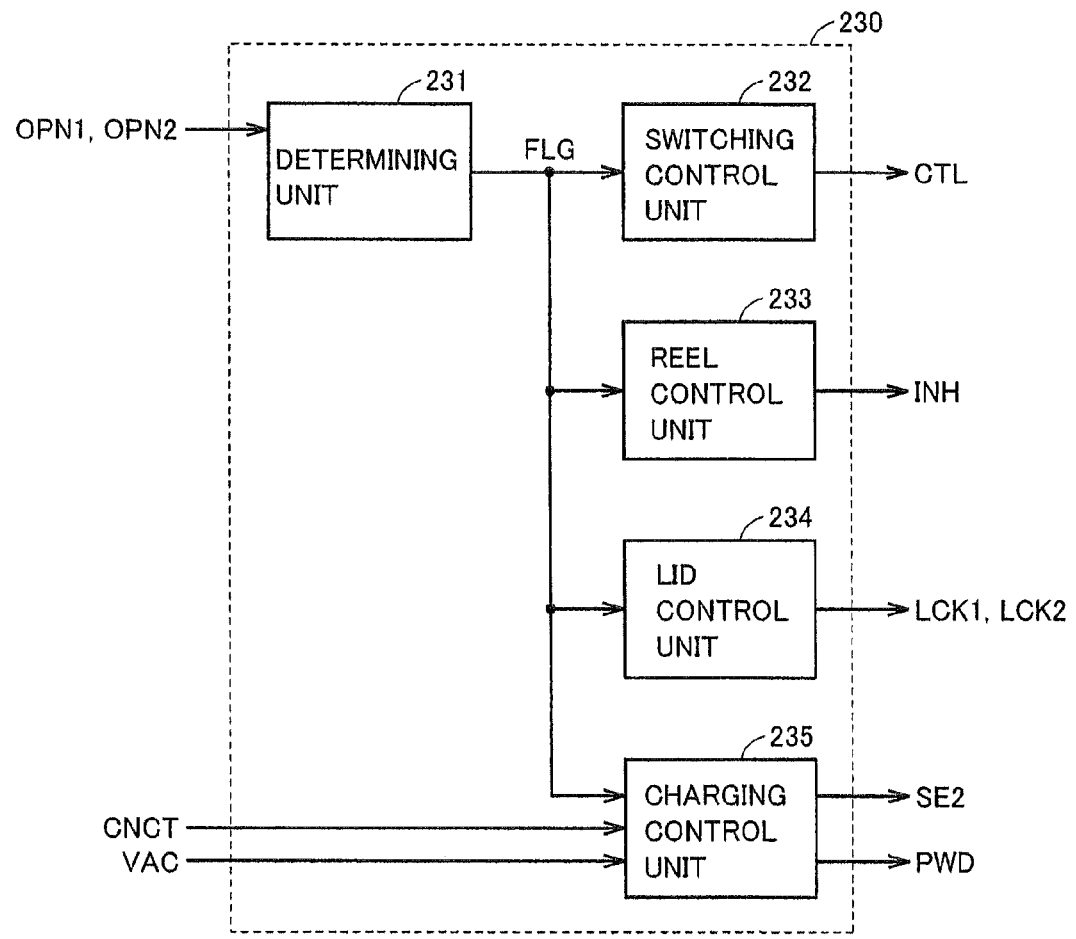
FIG. 6 is a function block diagram for illustrating charging control performed by a charging ECU in the present embodiment.
Figure 7:
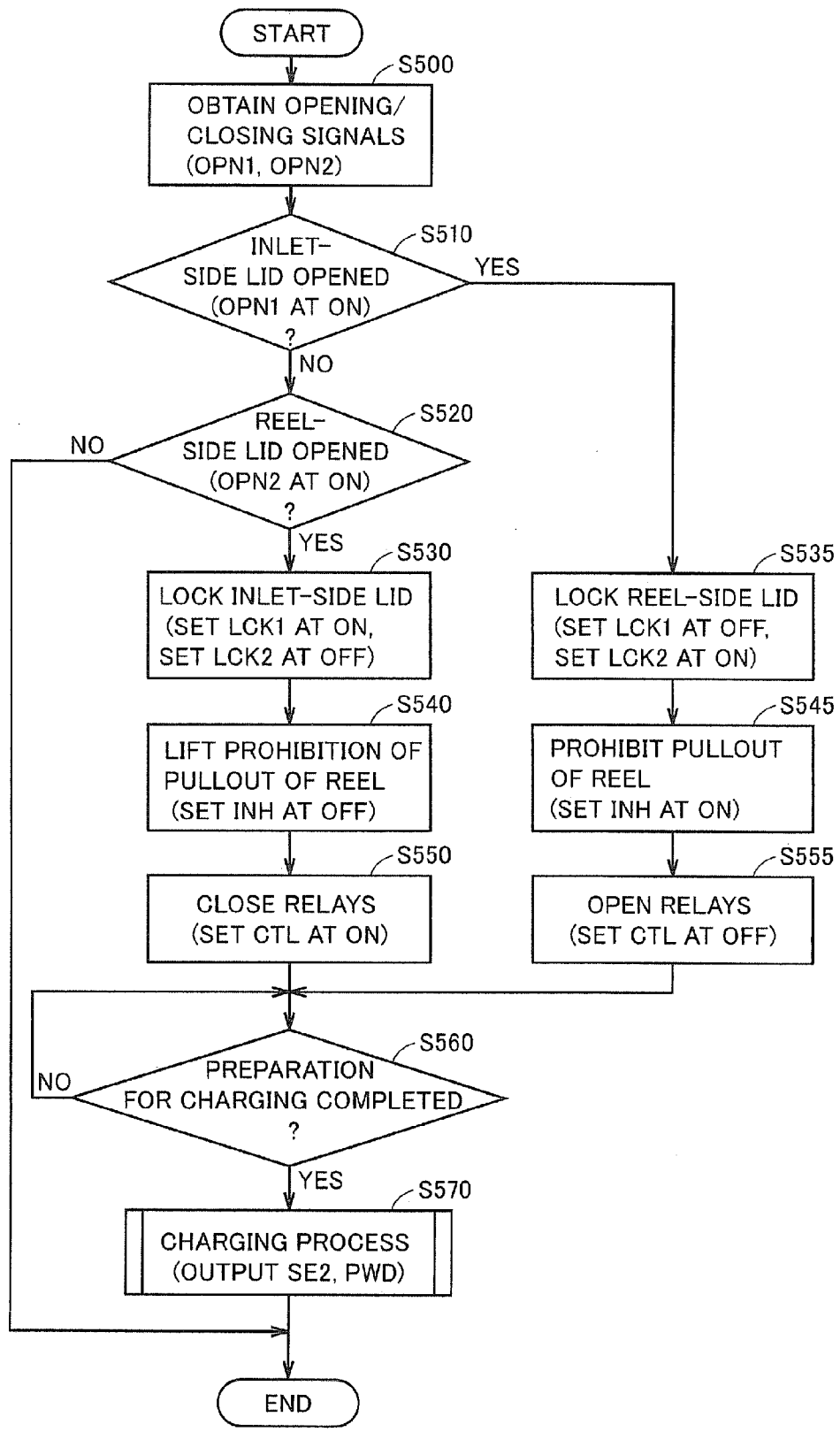
FIG. 7 is a flowchart for illustrating details of the charging control process performed by charging ECU in the present embodiment.

Referring to FIG. 6 and FIG. 7, the following describes charging control in the present embodiment.

In the vehicle that can be supplied with electric power via the two paths for external charging as shown in FIG. 1, it is desirable that while electric power is supplied via one path, electric power is not supplied via the other path.

For example, when different voltages are to be supplied using charging cable 420 and power receiving cord 430 respectively as described above, simultaneous electric power supply via both the paths may result in not only AC/DC converter 210 failing to perform appropriate power conversion but also damages of devices, because the supplied voltages are different.

In view of this, in the charging control of the present embodiment, when the lid of one power receiving port is opened, the lid of the other power receiving port is locked and is therefore prevented from being opened. Further, in the charging control of the present embodiment, when externally charging using electric power from the inlet 292 side, power receiving cord 430 is prevented from being pulled out from cord reel 250.

With such a configuration, electric power can be prevented from being simultaneously supplied from both the paths.

FIG. 6 is a function block diagram for illustrating the charging control performed by charging ECU 230 in the present embodiment. Each functional block illustrated in FIG. 6 is implemented by hardware or software processing performed by charging ECU 230.

Referring to FIG. 1 and FIG. 6, charging ECU 230 includes a determining unit 231, a switching control unit 232, a reel control unit 233, a lid control unit 234, and a charging control unit 235.

Determining unit 231 receives opening/closing signals OPN1, OPN2 regarding lids 291, 296 and detected by switches 294, 299. In accordance with opening/closing signals OPN1, OPN2, determining unit 231 generates a state signal FLG indicating which one of the lids is opened. Then, determining unit 231 sends this state signal FLG to switching control unit 232, reel control unit 233, lid control unit 234, and charging control unit 235.

In accordance with state signal FLG from determining unit 231, switching control unit 232 sets control signal CTL for controlling switching unit 220, and sends it to switching unit 220. Specifically, when state signal FLG indicates that lid 296 of power receiving port 295 is opened to pull out power receiving cord 430, control signal CTL is set to close relays RY3, RY4 included in switching unit 220. On the other hand, when lid 291 of power receiving port 290 for connecting charging cable 420 to inlet 292 is opened and when both the lids are closed, control signal CTL is set to open relays RY3, RY4 included in switching unit 220.

Reel control unit 233 receives state signal FLG from determining unit 231. When lid 291 at the inlet 292 side is opened, reel control unit 233 sets control signal INH at ON and sends it to pullout prohibiting unit 280 so as to prohibit pullout of power receiving cord 430. On the other hand, when lid 296 at the power receiving cord 430 side is opened, reel control unit 233 sets control signal INH at OFF to lift the prohibition of pullout of power receiving cord 430.

In accordance with state signal FLG from determining unit 231, lid control unit 234 sets lock signals LCK1, LCK2 to prohibit opening of the lids. Specifically, when lid 291 at the inlet 292 side is opened, lid control unit 234 sets lock signal LCK2 at ON so as not to open lid 296 at the power receiving cord 430 side. On the other hand, when lid 296 at the power receiving cord 430 side is opened, lid control unit 234 sets lock signal LCK1 at ON so as not to open lid 291 at the inlet 292 side. When both the lids are closed, lock signals LCK1, LCK2 are both set at OFF.

Charging control unit 235 receives state signal FLG from determining unit 231, detection value of voltage VAC from voltage sensor 240, and connection signal CNCT indicating that charging connector 421 has been connected. When a lid is opened and voltage from external power source 400 is detected, charging control unit 235 outputs control signal SE2 to close relay RY10. Further, in accordance with voltage VAC, charging control unit 235 generates control signal PWD for AC/DC converter 210 to control AC/DC converter 210. It should be noted that a state of connection signal CNCT may be taken into consideration in the case where external charging is performed using charging cable 420.

FIG. 7 is a flowchart for illustrating details of the charging control process performed by charging ECU 230. Each step in the flowchart of FIG. 7 is performed by executing, in a predetermined cycle, a program previously stored in charging ECU 230. Alternatively, processes of a part of the steps can be implemented by dedicated hardware (electronic circuit).

Referring to FIG. 1 and FIG. 7, in a step (hereinafter, the term "step" is abbreviated as "S") 500, charging ECU 230 obtains opening/closing signals OPN1, OPN2 for lids 291, 296.

Next, in S510, in accordance with opening/closing signal OPN1, charging ECU 230 determines whether or not lid 291 at the inlet 292 side is opened.

When lid 291 is opened (YES in S510), charging ECU 230 determines that external charging is to be performed using charging cable 420. Then, the process proceeds to S535, in which charging ECU 230 sets lock signal LCK2 at ON to lock lid 296 at the power receiving cord 430 side. In this way, lid 296 cannot be opened.

Then, in S545, charging ECU 230 sets control signal INH at ON. In this way, power receiving cord 430 is prohibited from being pulled out from cord reel 250.

Next, in S555, charging ECU 230 sets control signal CTL at OFF. In this way, relays RY3, RY4 of switching unit 220 are opened. Thereafter, the process proceeds to S560.

On the other hand, when lid 291 is closed (NO in S510), the process proceeds to S520, in which determination is made as to whether or not lid 296 at the power receiving cord 430 side is opened.

When lid 296 is closed (NO in S520), charging ECU 230 determines that external charging is not to be performed, and terminates the process.

On the other hand, when lid 296 is opened (YES in S520), charging ECU 230 determines that external charging is to be performed using power receiving cord 430. Then, the process proceeds to S530, in which charging ECU 230 sets lock signal LCK1 at ON to lock lid 291 at the inlet 292 side. In this way, lid 291 cannot be opened.

Then, in S540, charging ECU 230 sets control signal INH at OFF. Accordingly, the prohibition of pullout of power receiving cord 430 from cord reel 250 is lifted.

Next, in S550, charging ECU 230 sets control signal CTL at ON. Accordingly, relays RY3, RY4 of switching unit 220 are closed. Thereafter, the process proceeds to S560.

In S560, charging ECU 230 determines, based on the detection value of voltage VAC from voltage sensor 240 and the like, whether or not preparation for external charging has been completed.

When the preparation for external charging has not been completed (NO in S560), the process is returned to S560 to stand by for completion of the preparation for external charging.

On the other hand, when the preparation for external charging has been completed (YES in S560), the process proceeds to S570, in which charging ECU 230 outputs control signal SE2 to close relay RY10 and outputs control signal PWD to cause AC/DC converter 210 to perform the power conversion operation. When charging of power storage device 110 is completed, charging ECU 230 terminates the process.

By performing the control in accordance with the above-described process in the vehicle that can be supplied with electric power from outside via the plurality of paths for external charging, electric power can be supplied from one selected power supply path while preventing simultaneous power supply from the other path. In this way, during external charging, a trouble and the like can be prevented which results from simultaneous electric power supply via the plurality of paths.

Figure 8:
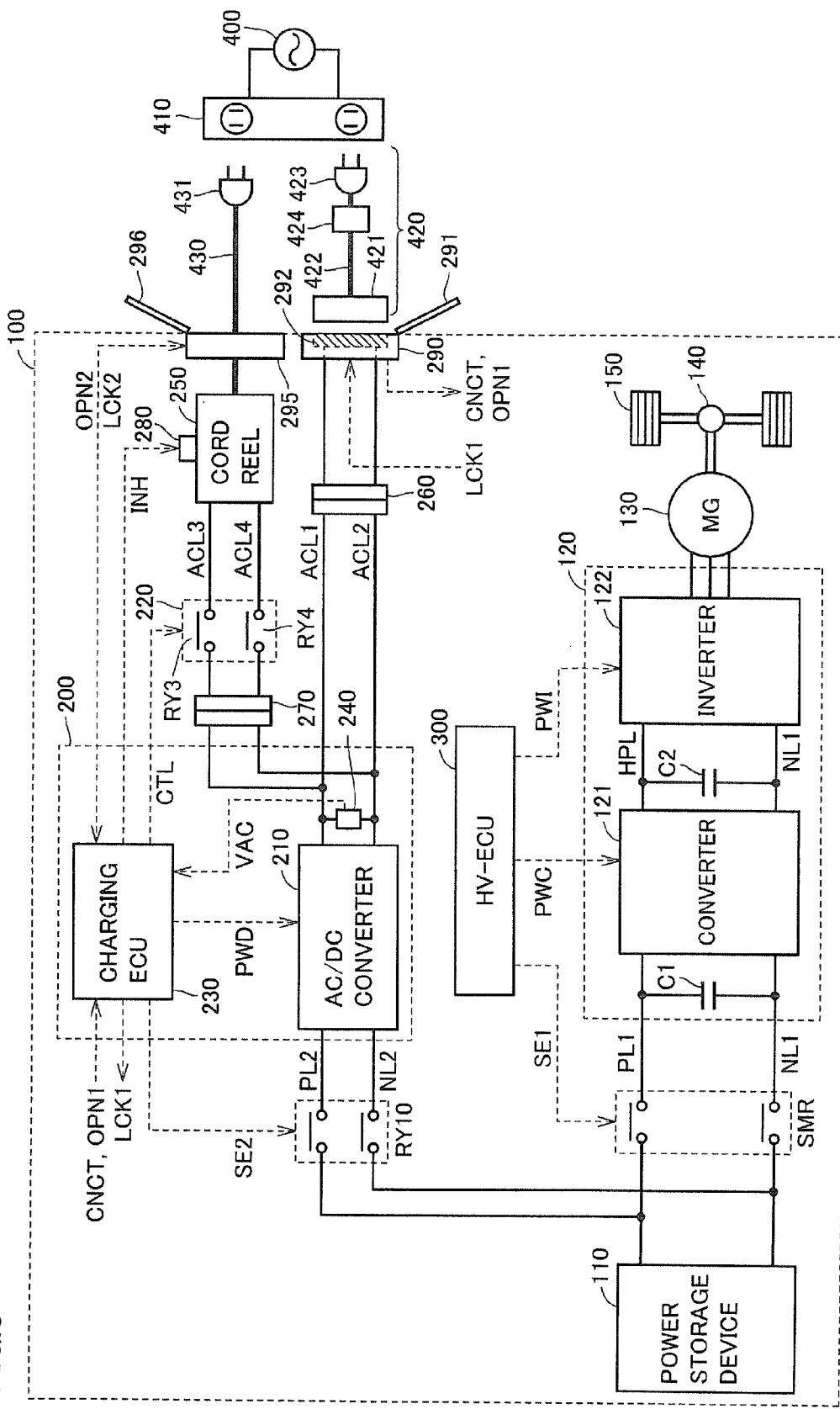
FIG. 8 is an overall block diagram of a vehicle according to another example of the present embodiment.

It should be noted that in the above description, switching unit 220 is provided between AC/DC converter 210 and connector 270 on power lines ACL3, ACL4 as shown in FIG. 1, but switching unit 220 may be provided between cord reel 250 and connector 270 on power lines ACL3, ACL4 as shown in FIG. 8.

Figure 9:
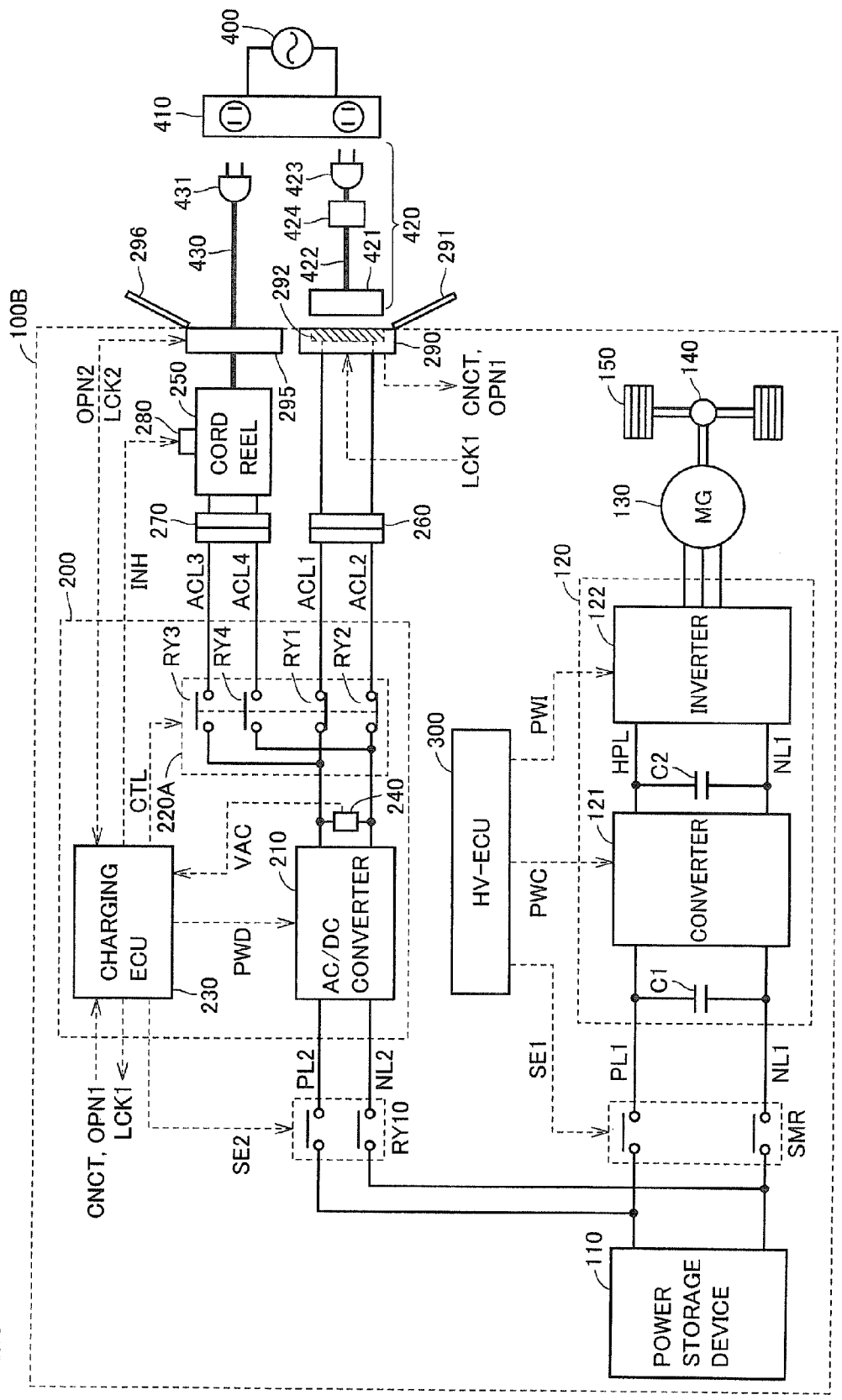
FIG. 9 is an overall block diagram of a vehicle according to still another example of the present embodiment.

Further, it has been illustrated that switching unit 220 is configured to switch between supply and interrupt of electric power transferred via power receiving cord 430, but electric power transferred from the inlet 292 side may be also switched between supply and interrupt as in a switching unit 220A of a vehicle 100B shown in FIG. 9 as another example of the present embodiment.

Vehicle 100B shown in FIG. 9 is configured by replacing switching unit 220 of vehicle 100 of FIG. 1 with switching unit 220A.

Switching unit 220A includes relays RY1-RY4. Relays RY3, RY4 are inserted in power lines ACL3, ACL4 respectively, as with those in vehicle 100. Further, relays RY1, RY2 are respectively inserted in power lines ACL1, ACL2 to switch between supply and interrupt of electric power transferred from the inlet 292 side.

Relays RY1-RY4 operate in conjunction with one another in accordance with control signal CTL from charging ECU 230. Specifically, when control signal CTL is OFF, relays RY1, RY2 are closed and relays RY3, RY4 are opened. On the other hand, when control signal CTL is ON, relays RY1, RY2 are opened and relays RY3, RY4 are closed.

With such a configuration, when electric power is supplied via one path, electric power via the other path can be securely interrupted.

It should be noted that in the present embodiment, the above-described locking operations for lids 291, 296 and the operation of pullout prohibiting unit 280 are electrically controlled by charging ECU 230, but the locking operations for lids 291, 296 and the operation of pullout prohibiting unit 280 may be mechanically in conjunction with opening operations of lids 291, 296.

It should be noted that AC/DC converter 210 in the present embodiment is one example of "power converting device" of the present invention. Power lines ACL1, ACL2 in the present embodiment are one example of "first power line" and power lines ACL3, ACL4 are one example of "second power line" in the present invention. Charging ECU 230 in the present embodiment is one example of "control device" of the present invention. Power receiving ports 290 and 295 in the present embodiment are examples of "first power receiving port" and "second power receiving port" respectively in the present invention. Lids 291 and 296 in the present embodiment are examples of "first cover unit" and "second cover unit" in the present invention.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST 100, 100A, 100B: vehicle; 110: power storage device; 120: PCU; 121: converter; 122: inverter; 130: motor generator; 140: power transmitting gear; 150: driving wheel; 200: charging device; 210: AC/DC converter; 220, 200A: switching unit; 230: charging ECU; 231: determining unit; 232: switching control unit; 233: reel control unit; 234: lid control unit; 235: charging control unit; 240: voltage sensor; 250: cord reel; 260, 270: connector; 280: pullout prohibiting unit; 285: protruding portion; 290, 295: power receiving port; 291, 296: lid; 292: inlet; 293, 298 joint; 294, 299: switch; 297: pullout opening; 300: HV-ECU; 400: external power source; 410: receptacle; 420: charging cable; 421: charging connector; 422: electric wire portion; 423, 431: plug; 424: CCID; 425: operation switch; 426: coupler unit; 427: latch unit; 430: power receiving cord; 431: power source plug; ACL1-ACL4, HPL, PL1, PL2: power line; C1, C2: capacitor; NL1, NL2: ground line; RY1-RY4, RY10: relay.

The invention claimed is:

1. A vehicle externally chargeable using electric power from an external power source, the vehicle comprising:
a power storage device that is chargeable;
a power converting device configured to convert electric power supplied from the external power source into electric power for charging the power storage device;
an inlet, the inlet being provided at an external surface of the vehicle and being configured to connect to a charging cable located outside of the vehicle so as to transfer electric power from the external power source;
a first power line connected to the inlet and the power converting device;
at least one connector inserted in the first power line; and
a second power line, the second power line being branched from a portion of the first power line that connects the at least one connector and the power converting device to each other.

2. The vehicle according to claim 1, further comprising a power receiving cord for that transfers electric power from a receptacle of the external power source to the vehicle, wherein
the power receiving cord has one end connected to the second power line and has another end connected to a plug for connection to the receptacle.

3. The vehicle according to claim 2, further comprising a cord reel that reels the power receiving cord for storage.

4. The vehicle according to claim 2, wherein the power receiving cord and the inlet are selectively used for the external charging.

5. The vehicle according to claim 4, further comprising:
a switching unit that switches between supply and cut off of electric power from the power receiving cord to the power converting device; and
a control device for controlling the switching unit; wherein
when the external charging is performed using electric power supplied from the power receiving cord, the control device controls the switching unit to bring the switching unit into an electrically conductive state, and when the external charging is performed using electric power supplied from the inlet, the control device controls the switching unit to bring the switching unit into an electrically non-conductive state.

6. The vehicle according to claim 4, further comprising:
a first power receiving port provided with the inlet;
a first cover unit coupled to the first power receiving port, the first cover unit being configured to be opened when the inlet is used;
a second power receiving port provided with a pullout opening for the power receiving cord; and a second cover unit coupled to the second power receiving port, the second cover unit being configured to be opened when the power receiving cord is used, wherein
when the first cover unit is opened, opening of the second cover unit is prohibited, and when the second cover unit is opened, opening of the first cover unit is prohibited.

7. The vehicle according to claim 4, further comprising:

a cord reel that reels the power receiving cord for storage; and a pullout prohibiting unit configured to prohibit pullout of the power receiving cord from the cord reel when the external charging is performed using electric power supplied from the inlet.

\* \* \* \* \*